Patented Mar. 6, 1934

1,950,100

UNITED STATES PATENT OFFICE 1,950,100

CHONDROITIN COMPOUNDS AND THEIR PREPARATION

Lathan A. Crandall, Jr., Chicago, Ill.

No Drawing. Application June 2, 1932,
Serial No. 615,039

8 Claims. (Cl. 167—68)

The present invention relates to a new compound, and the process of its preparation, suitable for use in the treatment of diseases such as migraine, urticarial eruptions, peptic ulcers, multiple sclerosis, various allergic phenomena, as well as for treatment of those afflicted with various cachectic states associated with hepatic cirrhosis and obstructions in the biliary outflow and general nutritional disturbances. It has also been found useful in the nutrition of living organisms having Eck fistulæ.

One of the objects of the present invention is to prepare a non-toxic concentrated preparation consisting of a major proportion of chondroitin and chondroitin-sulphuric acid, either free, or in the form of their alkali, calcium, magnesium, iron salts, and/or compounds of a non-toxic nature.

A further object of the invention is to provide a remedial compound consisting of the magnesium, calcium, or iron salt or compound of chondroitin and chondroitin-sulphuric acid, either alone or in admixture, the said compound being suitable for the treatment of the conditions above enumerated.

Further objects of the invention will appear from the description hereinbelow.

The essential subject matter of the present invention lies in the discovery that there may be obtained from mammalian cartilage very active compounds which are particularly indicated in the treatment of diseases such as peptic ulcers, urticaria, various cachectic states, and other related diseases of a similar character.

The particular compounds with which the present invention is concerned are the alkali metal as well as the magnesium, calcium and iron salts of chondroitin and chondroitin-sulphuric acid, as well as the free acid itself. These compounds are non-toxic because the metallic ingredient thereof is relatively innocuous and may possibly even add to the efficacy of the product when used for its intended purpose. The substances chondroitin and chondroitin-sulphuric acid have been described in the literature only in the form of toxic and/or impure compounds such as their barium or lead salts which, because of the presence of impurities, are incapable of being utilized for medicinal purposes. Furthermore, as described in the literature, these toxic and impure compounds were not recognized as having any medicinal or therapeutic value whatsoever, whereas, in accordance with the present invention, the pure non-toxic compounds produced in accordance with the process about to be described are of great therapeutic value and represent a marked forward step in this field. While it is at present impossible to state definitely the reasons why chondroitin and chondroitin-sulphuric acid, particularly in the form of their magnesium salt, are so efficacious in treating the diseases above enumerated and to alleviate the results thereof, it may be stated theoretically that the presence of glucuronic acid in the said compounds probably accounts, at least in part, for their action. The present invention, however, is not to be limited by this statement, as further work may demonstrate that some of the other components of the compound are responsible for its particular physiological effects.

In some cases the free chondroitin and chondroitin-sulphuric acid is preferred.

Chondroitin-sulphuric acid is believed to have the following structural formula:

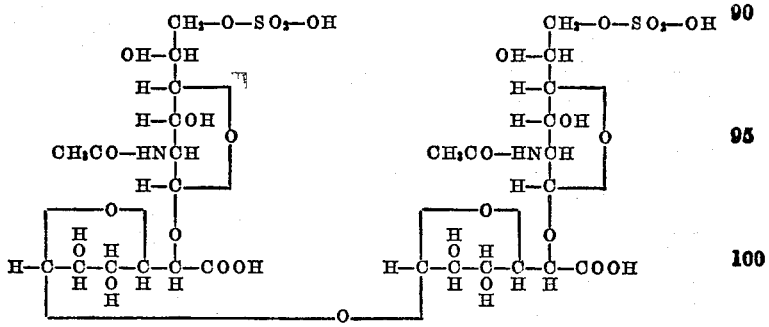

and is presumably composed of 2 molecules of glucuronic acid, 2 molecules of acetylated hexosamine, and 2 molecules of sulphuric acid. It will be seen from this formula that the product contains two sulphuric acid groups, two acetyl groups, and at least two free carboxyl groups.

It is also believed that the remedial effects of the product for the purposes indicated are due to the presence therein of the glucuronic acid groups. The product has been described in the literature, but only from a theoretical and experimental standpoint, being prepared from cartilage, tendons, aorta, or sclera. As thus prepared, for purposes of investigation, it was converted into the barium or lead salt, upon which most of the work has been done. Thus far, however, with the exception of the methods of the present invention, the compounds chondroitin and chondroitin-sulphuric acid, non-toxic salts, or admixtures thereof, have never been prepared in a state pure enough to be tested upon living organisms. In accordance with the present invention, the alkali-metal, calcium, magnesium and iron salts have also been prepared. The free acid and chondroitin have been administered to animals as well as to human beings, and the clinical results investigated. It is to the alkali-metal, calcium, magnesium and iron salts of chondroitin and chondroitin-sulphuric acid, or admixtures thereof, when in a state of purity capable of administration to human beings, that particular claim is laid herein.

In order that a more thorough understanding of the present invention may be had, there will now be described a number of methods of producing the non-toxic chondroitin and chondroitin-sulphuric acid compounds found to yield satisfactory results. In any of the four methods given, the original step is the same, namely:

Mammalian cartilage, such, for example, as that from the noses of horses, cattle, etc. or from the cartilaginous lower ribs, or from ears, is obtained, carefully freed from adhering meat and fibrous tissue, and thereupon finely comminuted as by grinding or chopping. The ground cartilage thus obtained is thereupon subjected to treatment for a period of from 12 to 48 hours at room temperature with a 2% solution of potassium hydroxide. The strength of this solution may be varied between 2% and 5% and, if desired, the less expensive sodium hydroxide may be used, using percentages giving the same hydroxyl concentration. At the end of this treatment with the potassium hydroxide solution, the resulting fluid is filtered off through a foraminous fabric, such as cheese cloth or the like, to remove the undissolved debris. To the strained liquid thus obtained sufficient acetic acid is added until a reaction acid to litmus is obtained. Thus concludes the preliminary step, for, from this point on, any one of the methods described hereinbelow may be used.

*Method 1.*—To the fluid obtained as above described there is added an excess of magnesium oxide, hydroxide or carbonate, and the resultant mixture is heated upon a water bath, say from 4 to 6 hours, during which period a certain amount of evaporation may take place, although it is not essential that any given quantity of the water present be evaporated, the main object being to heat the material. The mixture thus obtained is subjected to centrifugation so as to cause sedimentation of insoluble matter therein, whereupon the supernatant liquid is decanted and mixed with 1¼ volumes of 95% alcohol. This results in the formation, in the mixed liquids, of a precipitate which gradually settles out. The mixture is allowed to stand until the precipitate has accumulated at the bottom thereof and the supernatant liquid has become clear, whereupon the greater part of the said supernatant liquid is decanted off and the remainder subjected to centrifugation in order to cause a more complete separation of the desired precipitate. The precipitate thus obtained is the crude magnesium salt of chondroitin-sulphuric acid. This magnesium salt is thereupon treated with the smallest possible amount of the water, and the solution thus obtained mixed, with constant stirring, with 6 volumes of glacial acetic acid. In case the magnesium salt solution is not clear, it may be centrifuged or filtered. The addition of the acetic acid precipitates a non-toxic form of chondroitin-sulphuric acid, or its acid salt, still containing, however, small amounts of magnesium as an impurity. As magnesium, however, is entirely non-toxic, this does not impair the physiological value of the preparation. The precipitate of chondroitin-sulphuric acid, or its acid salt, thus obtained is removed from the acetic acid solution by filtering the same, preferably by means of suction, in a Buchner funnel or its equivalent, and is then washed with alcohol, then with ether, and finally dried in vacuo. The resulting product is of sufficient purity for administration per os to human beings.

*Method 2.*—The procedure in this case is substantially the same as described in Method 1 through to the addition of the magnesium oxide and the incubation on a water bath and centrifugation as therein described, with the exception that the supernatant fluid, instead of first being precipitated with alcohol so as to obtain the magnesium salt, is treated with 6 volumes of glacial acetic acid. Because of the much larger amount of acetic acid necessary, however, this method is not as economical as Method 1, although operative. As an alternative, the said supernatant fluid, prior to precipitation with the glacial acetic acid, may be reduced in volume by evaporation on the water bath, taking several hours, or more rapidly by evaporation in vacuo at 80° C. After such evaporation, however, the fluid must again be submitted to centrifugation in order to remove precipitates, the clarified fluid from the centrifugal then being precipitated, as in Method 1, by the addition of 6 volumes of glacial aretic acid.

*Method 3.*—The potassium hydroxide hydrolyzate of the cartilage may be handled in exactly the same manner as above described, except that calcium carbonate is substituted for the magnesium oxide. It may be stated that the use of calcium carbonate yields a product containing a slightly higher percentage of impurities than does the magnesium product, this being made evident by the darkened color of the final product. However, the product made by the aid of calcium carbonate is also entirely non-toxic and may be used in exactly the same way as the magnesium product.

For the purposes of the present invention, the other alkaline earths are not equivalents, as barium—while combining with chondroitin and chondroitin-sulphuric acid to form compounds—is found to be incapable of removal, so that the product when made by the aid of a barium salt still contains this poisonous element and hence cannot be used for therapeutic purposes. The best preparation is obtained by the use of magnesium, but it is also within the scope of the invention to employ the free chondroitin or chondroitin-sulphuric acid.

The free chondroitin-sulphuric acid, or the alkali salts thereof, may also be employed for the production of other metallic salts of the chondroitin-sulphuric acid. A particularly interesting compound, therapeutically usable, is the iron salt. This may be made as follows:—

Sufficient of the free chondroitin-sulphuric acid or of one of its alkali salts (such as potassium or sodium salt for example) to form a 2% solution is dissolved or dispersed in water, whereupon an excess of ferric chloride is added. A change in color is the only immediate indication of the resulting metathesis. However, upon the addition of an equal, or two, volumes of alcohol, a pale yellowish flocculent precipitate of the iron salt is formed. This can be separated by filtration or by centrifugation. When treated with water, the salt is found to be but slightly soluble therein. Most surprisingly, however, the addition of a slight amount of an alkali, such as sodium hydroxide solution, immediately causes the salt to dissolve, forming a clear solution having the characteristic reddish brown color of ferric salt solutions. Even an excess of the alkali will not precipitate the iron from the salt. This is one of the characteristic properties of this chondroitin compound.

In actual practice, in manufacturing the products on a commercial scale, it has been found that almost invariably mixtures of chondroitin and chondroitin-sulphuric acid are obtained, but such a mixture is just as efficacious as either of the products separately, because both of them contain the highly desirable glucuronic acid group.

The product as manufactured according to the above disclosure is characterized by being soluble in water but being insoluble in alcohol, acetone, ether, and acetic acid. When dissolved in pure water, the product of the present invention forms therewith a colloidal solution, as demonstrated by the fact that, when examined under an ultramicroscope, it exhibits the Tyndall cone phenomenon characteristic of colloidal solutions. On the addition of alkali to such a solution the same becomes water-clear. This proves that the chondroitin-sulphuric acid itself is not truly soluble in water but merely colloidally dispersable therein, while, on the other hand, the sodium salt of chondroitin-sulphuric acid appears to form a true solution. The chondroitin-sulphuric acid is also soluble in 50% glycerol or in 50% ethylene glycol. When ethyl alcohol is added to an aqueous solution of the sodium salt of chondroitin-sulphuric acid (prepared by neutralizing a solution of chondroitin-sulphuric acid with sodium hydroxide), precipitation begins to occur when the percentage of alcohol slightly exceeds 50%, the amount of chondroitin-sulphuric acid thus precipitated out increasing with increasing concentrations of alcohol. On the other hand, when acetone is added to a similar solution of the sodium salt of chondroitin-sulphuric acid, the Tyndall effect indicating that a colloidal solution has been formed, occurs when about 20% of acetone has been added, but the precipitation of the substance itself does not occur until the concentration of acetone reaches about 50%.

The substance obtained by the practice of the present invention, namely, a mixture of chondroitin and chondroitin-sulphuric acid or its non-toxic salts, is a clear, white, light powder of about the consistency of talcum powder and apparently is not hygroscopic. In its state of commercial purity, such as is capable of administration to human beings, it is found to have a faintly acid taste. Its aqueous solutions react acid, which would be expected from a substance containing both free $SO_2OH$ groups and carboxyl groups.

The outstanding characteristics of the products obtained according to the methods above described are their lack of toxicity, which enables them to be administered without danger of metallic poisoning. As described in the prior art, the pure chondroitin and chondroitin-sulphuric acid was never obtained, the earlier workers describing only products containing the same, more or less accurately identified, or as isolated in the form of barium or lead salts. As, however, both of these metals are fundamentally poisonous, such products could not be used internally. Furthermore, there is nothing whatever in any of the descriptions of the impure products to indicate that they had any physiological value or that they could be used for the purposes of combating diseases such as already hereinabove indicated, and for which the non-toxic product made as described herein appears to be of specific remedial value. From the structure of the material and the nature of its source, it could not have been foreseen, nor even suspected, that this product would behave physiologically as it does; and it was not until research leading to the preparation of a pure enough product was undertaken that the discovery was made that this product has the properties ascribed thereto. The substances obtained by means of the new processes hereinabove described are undoubtedly the real alkali, magnesium, calcium, and/or iron compounds of chondroitin and chondroitin-sulphuric acid. The compounds described in the literature never included either the calcium, magnesium, and/or iron compounds, nor the pure chondroitin-sulphuric acid, but always included impurities.

Besides the magnesium oxide, other equivalent compounds may be used, particularly magnesium carbonate and calcium oxide or the corresponding hydroxides.

What it is desired to protect by Letters Patent is expressed in the subjoined claims.

I claim:

1. A physiologically active preparation comprising a non-toxic metallic compound of chondroitin and chondroitin-sulphuric acid, in which the metal is of the class consisting of calcium, magnesium, and iron.

2. A physiologically active preparation comprising as its major constituent chondroitin-sulphuric acid combined with magnesium.

3. A physiologically active preparation comprising as its major constituent chondroitin-sulphuric acid combined with calcium.

4. A physiologically active preparation comprising as its major constituent chondroitin-sulphuric acid combined with iron.

5. The process of producing a physiologically active composition containing a chondroitin compound which comprises subjecting cartilage to the action of an alkali hydroxide and water to produce a solution; clarifying said solution to remove insoluble matter therefrom; acidifying said solution with a non-toxic acid; adding to the thus acidified solution a non-toxic metallic compound from the group consisting of magnesium oxide, magnesium carbonate, calcium oxide and calcium carbonate; heating the resulting mixture for some time to a temperature near but not above 100° C.; removing insoluble matter from the mixture by clarification; treating the thus obtained clarified liquid with at least an equal volume of alcohol to precipitate the compound of the metal above mentioned with the chondroitin compound; separating said precipitate and dissolving the same in water; treating the resulting aqueous solution with a large volume excess of glacial acetic acid to precipitate the chondroitin compound substantially free from alkaline-earth metals, and recovering said precipitate.

6. The process of producing a physiologically active composition containing a chondroitin compound which comprises subjecting mammalian cartilage to the action of potassium hydroxide and water to produce a solution; clarifying said solution to remove insoluble matter therefrom; acidifying said solution by means of acetic acid; adding to the thus acidified solution an excess of magnesium oxide and heating the resulting mixture for some time to a temperature near but not exceeding 100° C.; removing insoluble matter from said mixture by centrifugation; treating the clarified liquid thus obtained with 1¼ volumes of alcohol to precipitate the magnesium salt of the chondroitin compound; separating said precipitate and dissolving the same in a minimum amount of warm water; treating the resulting solution by adding thereto not less than 5 volumes thereof of glacial acetic acid to precipitate the desired chondroitin compound; filtering off the thus precipitated compound, washing the same with alcohol and then ether; and finally drying said compound.

7. The process of extracting a non-toxic chondroitin compound from cartilage which comprises the steps of hydrolyzing said cartilage by means of an alkali; and treating the water-soluble hydrolyzate thus obtained in the presence of an excess of acetic acid with a non-toxic metal compound selected from the group consisting of magnesium oxide, magnesium carbonate, calcium oxide and calcium carbonate to form the chondroitin compound of said metal.

8. The process of extracting a non-toxic chrondroitin compound from cartilage which comprises the steps of hydrolyzing said cartilage by means of potassium hydroxide; treating the potassium compound thus obtained with an excess of magnesium oxide in the presence of a slight excess of acetic acid to form the magnesium compound of chondroitin; and thereupon converting said magnesium compound into the desired chrondoitin compound by treating the former in concentrated aqueous solution with a large excess of glacial acetic acid.

LATHAN A. CRANDALL, Jr.